(12) United States Patent
Soehner

(10) Patent No.: US 9,797,265 B2
(45) Date of Patent: Oct. 24, 2017

(54) STATOR VANE ADJUSTING DEVICE OF A GAS TURBINE

(71) Applicant: Rolls-Royce Deutschland Ltd & Co KG, Blankenfelde-Mahlow (DE)

(72) Inventor: Dirk Soehner, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 929 days.

(21) Appl. No.: 13/833,271

(22) Filed: Mar. 15, 2013

(65) Prior Publication Data

US 2013/0266424 A1    Oct. 10, 2013

(30) Foreign Application Priority Data

Apr. 10, 2012    (DE) .................. 10 2012 007 129

(51) Int. Cl.
*F01D 17/16*    (2006.01)
*F01D 9/00*    (2006.01)
(Continued)

(52) U.S. Cl.
CPC .................. *F01D 9/00* (2013.01); *F01D 9/04* (2013.01); *F01D 17/162* (2013.01); *F02C 9/20* (2013.01);
(Continued)

(58) Field of Classification Search
CPC ........... F04D 27/00; F01D 17/16; F01D 17/12
See application file for complete search history.

(56) References Cited

U.S. PATENT DOCUMENTS 2,999,630 A * 9/1961 Warren ................. F01D 17/162
415/149.4
3,314,595 A    4/1967 Burge et al.
(Continued)

FOREIGN PATENT DOCUMENTS

| EP | 2258926 | 12/2010 |
|---|---|---|
| FR | 2881190 A1 | 7/2006 |
| JP | S4845912 | 6/1973 |

OTHER PUBLICATIONS

European Search Report dated Oct. 19, 2015 from counterpart European App No. 13000710.7.
(Continued)

*Primary Examiner* — Mark Laurenzi
*Assistant Examiner* — Shafiq Mian
(74) *Attorney, Agent, or Firm* — Shuttleworth & Ingersoll, PLC; Timothy Klima

(57) ABSTRACT

The present invention relates to a stator vane adjusting device of a gas turbine having a plurality of stator vanes each swivellable about a radial axis and arranged in at least two radial planes, as well as at least two stator vane adjusting rings connected to the respective stator vanes and rotatable in the circumferential direction by at least one actuating device, characterized in that the actuating device is connected to the stator vane adjusting rings by means of a first transmission device and that a second transmission device, which is not coupled to the actuating device, is arranged essentially opposite to the first transmission device, with the second transmission device being connected to the stator vane adjusting rings.

7 Claims, 6 Drawing Sheets

Figure 1:
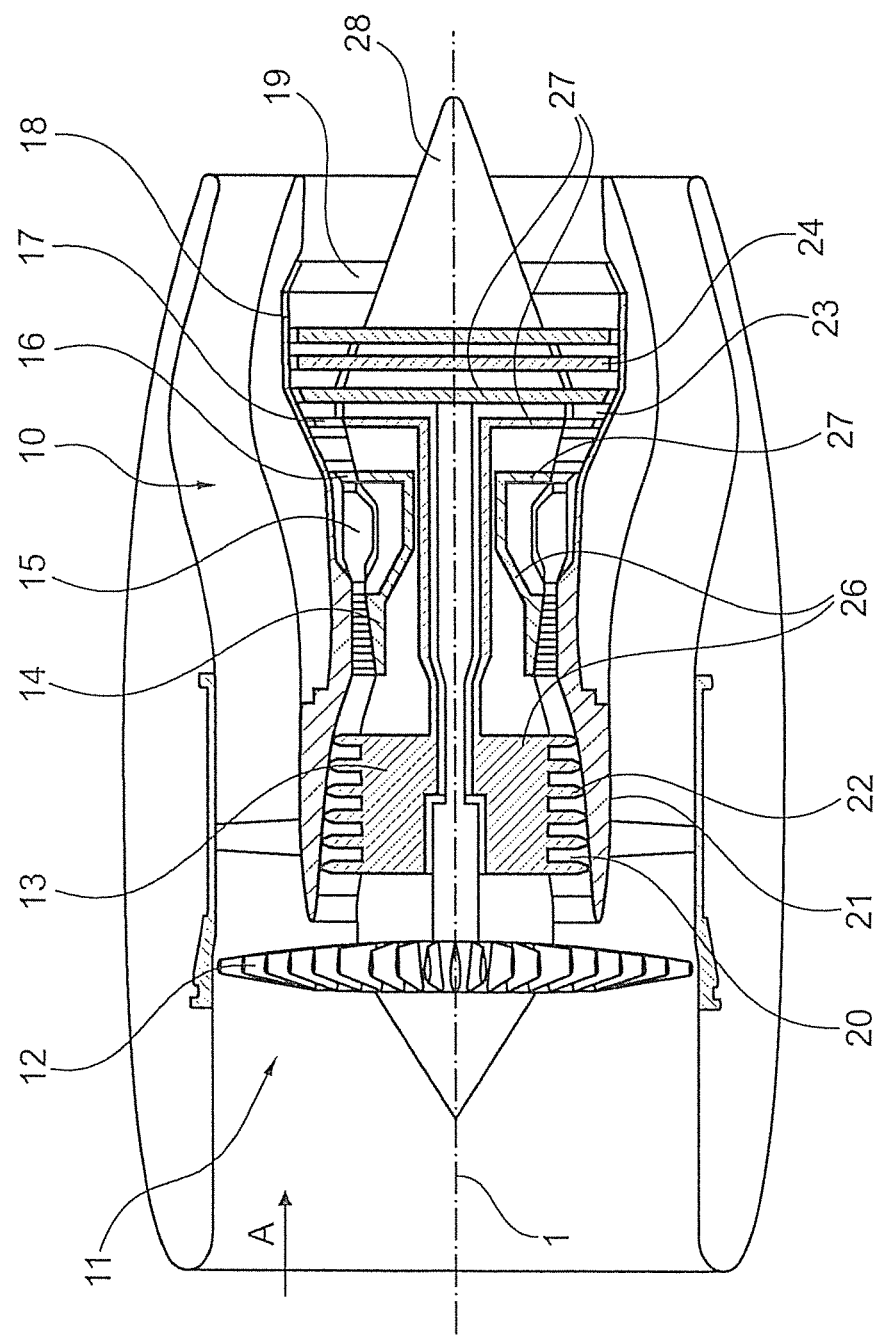

(51) Int. Cl.
*F04D 29/56* (2006.01)
*F01D 9/04* (2006.01)
*F02C 9/20* (2006.01)

(52) U.S. Cl.
CPC ........ *F04D 29/563* (2013.01); *F05D 2260/56* (2013.01); *F05D 2270/58* (2013.01); *F05D 2270/66* (2013.01)

(56) References Cited

U.S. PATENT DOCUMENTS

| | | | |
|---|---|---|---|
| 3,458,118 A | | 7/1969 | Burge et al. |
| 3,779,665 A | * | 12/1973 | Tatem, Jr. ............. F01D 17/162 137/601.05 |
| 4,390,318 A | * | 6/1983 | Weiler ................ F04D 27/0215 415/145 |
| 5,993,152 A | * | 11/1999 | Schilling ............... F01D 17/162 415/155 |
| 6,457,937 B1 | * | 10/2002 | Mashey ................ F01D 17/162 415/150 |
| 7,273,346 B2 | * | 9/2007 | Bouru ................... F01D 17/162 415/162 |
| 7,322,790 B2 | * | 1/2008 | Bouru ................... F01D 17/162 415/162 |
| 9,068,470 B2 | * | 6/2015 | Mills .................... F01D 17/162 415/162 |
| 9,097,137 B2 | * | 8/2015 | Suciu ................... F01D 17/162 415/162 |
| 9,151,178 B2 | * | 10/2015 | Holchin ................ F01D 17/162 475/331 |
| 9,188,138 B2 | * | 11/2015 | Keegan ................ F01D 17/162 415/162 |
| 2009/0162192 A1 | | 6/2009 | McCaffrey |
| 2010/0278639 A1 | | 11/2010 | Hood et al. |
| 2011/0176913 A1 | | 7/2011 | Wassynger et al. |
| 2013/0210572 A1 | * | 8/2013 | Coles .................... F01D 17/20 475/331 |

OTHER PUBLICATIONS

German Search Report dated Nov. 27, 2012 from counterpart application.

* cited by examiner

STATOR VANE ADJUSTING DEVICE OF A GAS TURBINE

This application claims priority to German Patent Application DE102012007129.9 filed Apr. 10, 2012, the entirety of which is incorporated by reference herein.

This invention relates to a stator vane adjusting device for a compressor or a turbine of a gas turbine.

In detail, the invention relates to a stator vane adjusting device for a compressor or a turbine having a plurality of stator vanes each swivellable about a radial axis and arranged in at least two radial planes. The stator vanes thus form in each case a disk-like arrangement, where rotor blades are arranged between the at least two stator vane arrangements and/or upstream and downstream in the flow direction, as is known from the state of the art.

For adjustment of the stator vanes of each disk-like arrangement of stator vanes, a stator vane adjusting ring is provided which is rotatable in the circumferential direction. The stator vane adjusting ring is connected to the respective stator vane using a lever mechanism, such that when the stator vane adjusting ring is rotated the stator vanes are swivelled about their radial axes. The stator vane adjusting ring is connected to a suitable actuating device.

Arrangements of this type are already known from EP 2 258 926 A2, US 2009/0162192 A1 or US 2010/0278639 A1, for example.

It is thus possible by means of the actuating device to adjust the pitch angle of the respective stator vane to the operating conditions of the compressor or turbine. The devices known from the state of the art can have the drawback that depending on the adjusting force applied by the actuating device, the stator vane adjusting ring is not evenly rotated, the result being differing swivel angles or adjustment angles for the individual stator vanes. The cause lies in particular in the occurrence of tangential forces acting on the stator vane adjusting ring when the actuating device is operated. As a result, differing setting angles of the stator vanes around the circumference of the stator vane arrangement can occur. This in turn leads to a non-optimum mode of operation of the compressor or turbine.

It was attempted in the state of the art to find a design solution for these effects in particular by making the stator vane adjusting rings and their mounting more complex or by increasing the number of active actuating mechanisms. This however results in additional costs, additional weight and a greater space requirement.

The object underlying the present invention is to provide a stator vane adjusting device for a compressor or a turbine of a gas turbine of the type specified at the beginning which, while being simply designed and easily and cost-effectively producible, avoids the disadvantages of the state of the art and enables precise adjustment of the stator vanes.

It is a particular object of the present invention to provide solution to the above problems by a combination of features described herein. Further advantageous embodiments of the present invention become apparent from the present description.

It is thus provided in accordance with the invention that the actuating device is connected to the stator vane adjusting rings by means of a first transmission device and that a second transmission device is provided which is likewise connected to the stator vane adjusting rings. This second transmission device is preferably arranged opposite to the first transmission device.

The basic principle of the invention is thus based on supplementing the first transmission device, which links the movement of the actuating device to the stator vane adjusting rings, by a second transmission device which is not connected to an actuating device but instead passively connects the two stator vane adjusting rings to one another. The result of the second transmission device is thus a passive mechanism which leads to a forced connection of the two stator vane adjusting rings. Due to this forced connection, mutual control of any rotation of the stator vane adjusting rings assured. With a preferably diametrical or opposite arrangement of the second transmission device relative to the first transmission device (referred to a plane radial to the engine axis), the forces acting in the circumferential direction are introduced into the respective stator vane adjusting rings such that the latter can precisely rotate relative to one another and to the stator vanes when the actuating device is operated.

In accordance with the invention, the first and the second transmission devices are designed preferably as a crankshaft or as a lever gear. The type and the design of the transmission devices correspond here to the designs known from the state of the art, so that the latter require only little or no modification.

In a particularly favourable embodiment of the invention, it is provided that the first transmission device and the second transmission device are in each case designed identical and/or with the same kinematic effect. The result of this is a particularly precise connection and mutual control of the movements of the two stator vane adjusting rings when rotated by the actuating device.

It is also possible in accordance with the invention to connect more than two stator vane adjusting rings, for example three or four stator vane adjusting rings, to one another using a first and a second transmission device. Differing rotation angles of the stator vane adjusting rings for adjustment of the respective stator vanes in differing stator vane arrangements of the compressor or turbine can result here from the design of the transmission devices when the actuating device is operated.

In a development of the invention it is also possible to arrange several actuating devices and several first and second transmission devices spread over the circumference. This can prove advantageous particularly for compressors or turbines of large diameter, since the individual actuating devices can have smaller dimensions for applying a sufficient adjusting force. In an arrangement of this type too, it is provided in accordance with the invention that second transmission devices are arranged symmetrically offset, e.g. by 90° relative to the first transmission devices. These second transmission devices have a passive effect and connect the individual stator vane adjusting rings to one another such that their movement, and hence the adjustment of the stator vane adjusting rings, is performed precisely.

In line with the basic principle in accordance with the invention, the first transmission device thus forms an active transmission device for applying the adjusting force of the actuating device (master), while the second transmission has a passive effect (slave).

Figure 2:
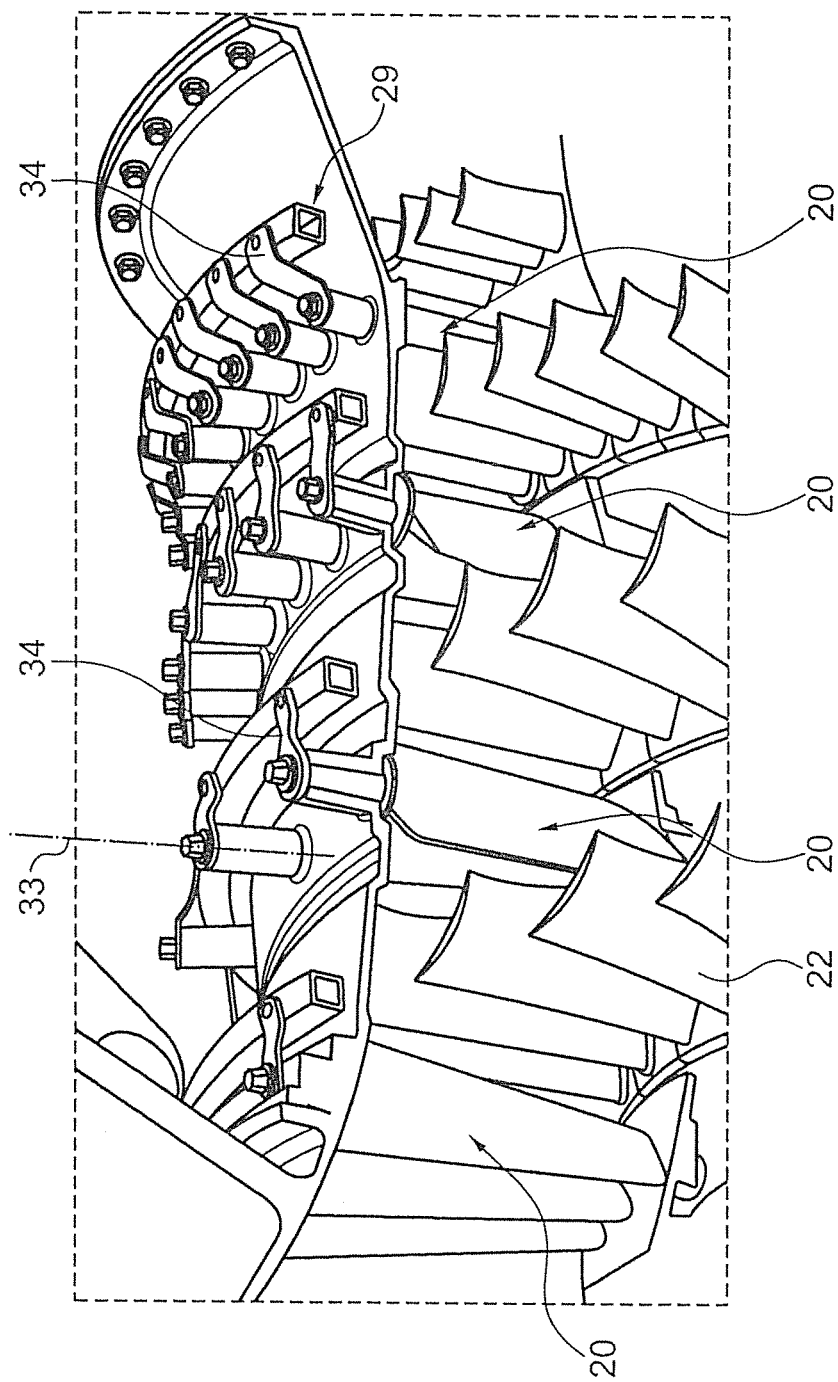
Figure 3:
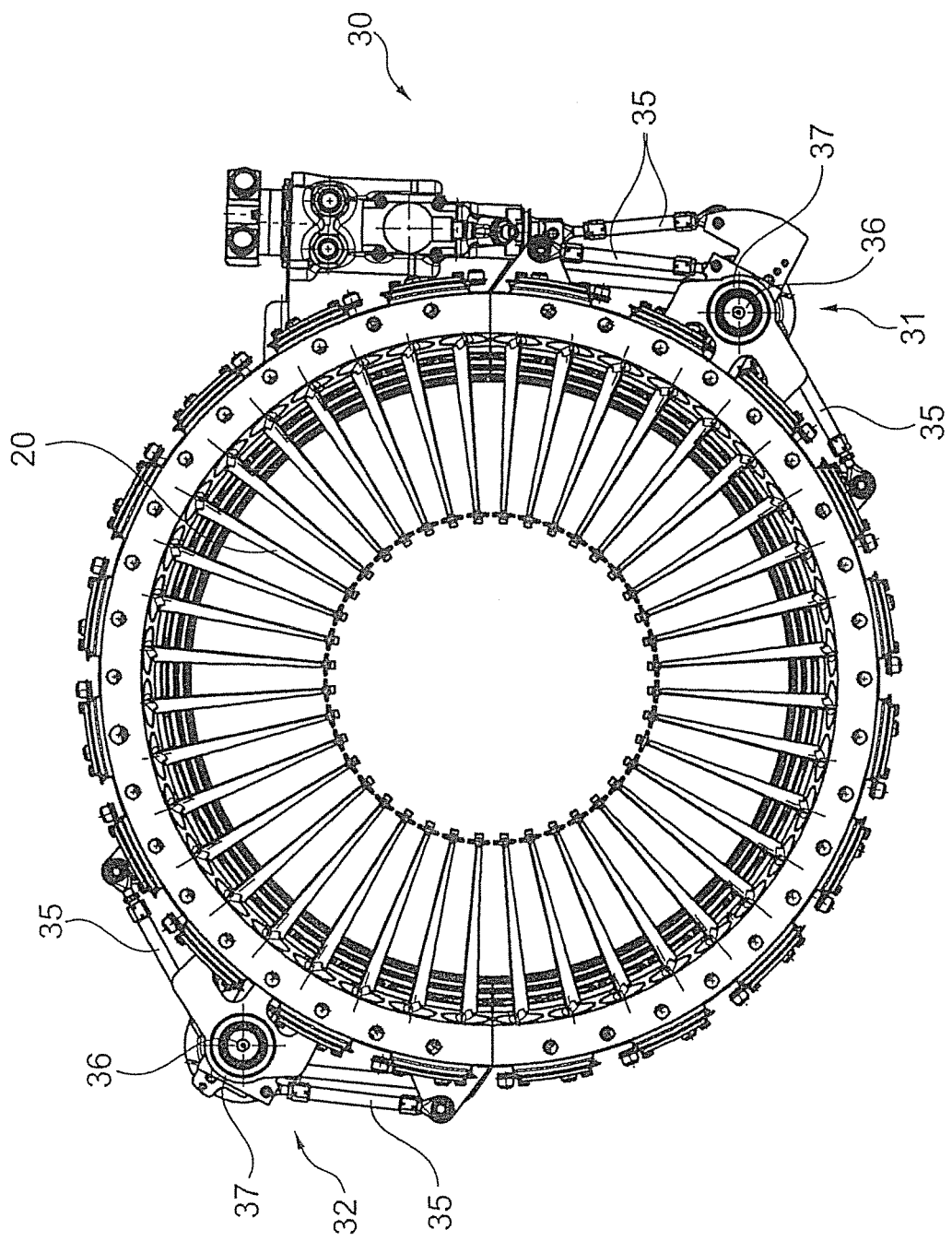
Figure 4:
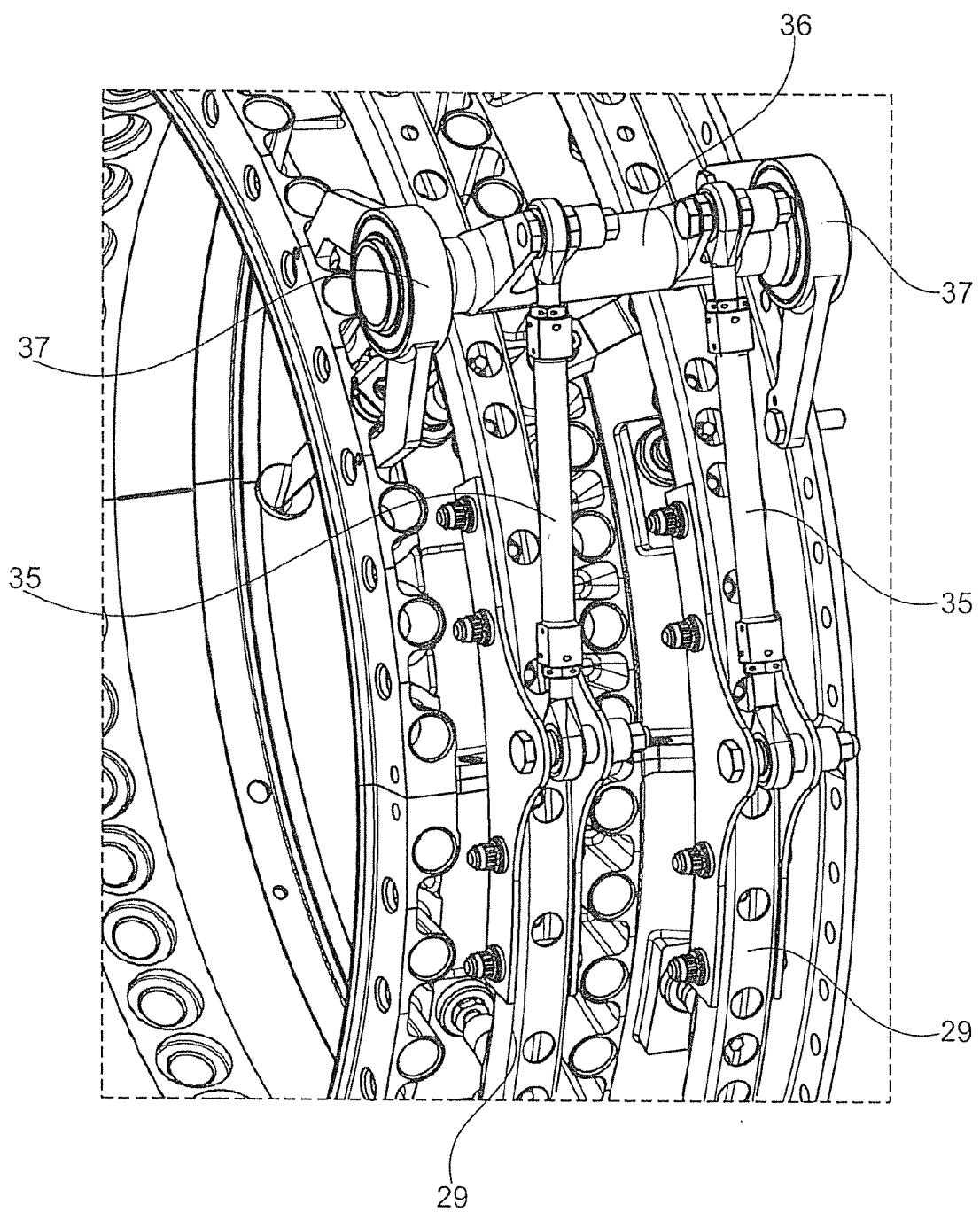
Figure 5:
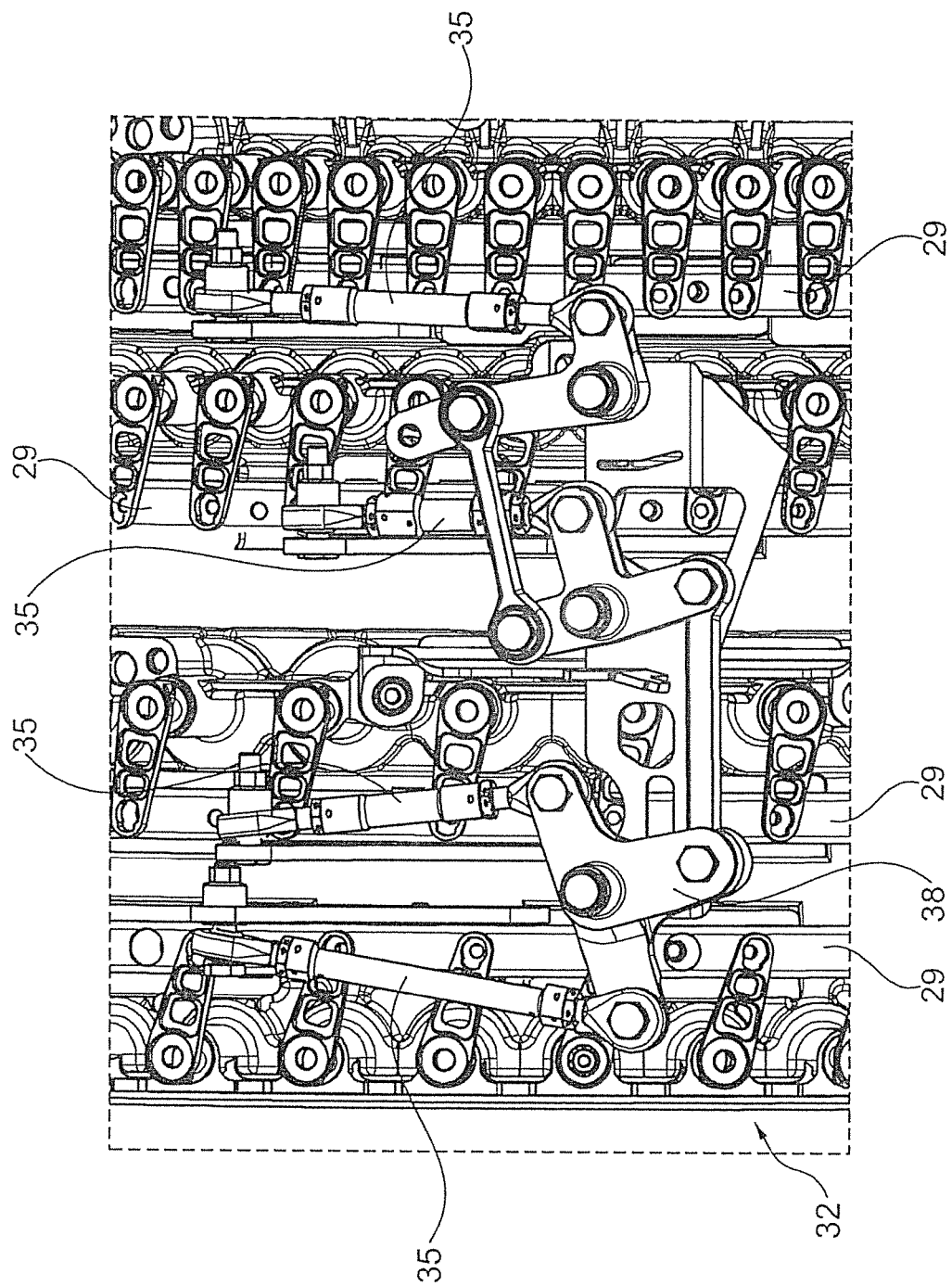
Figure 6:
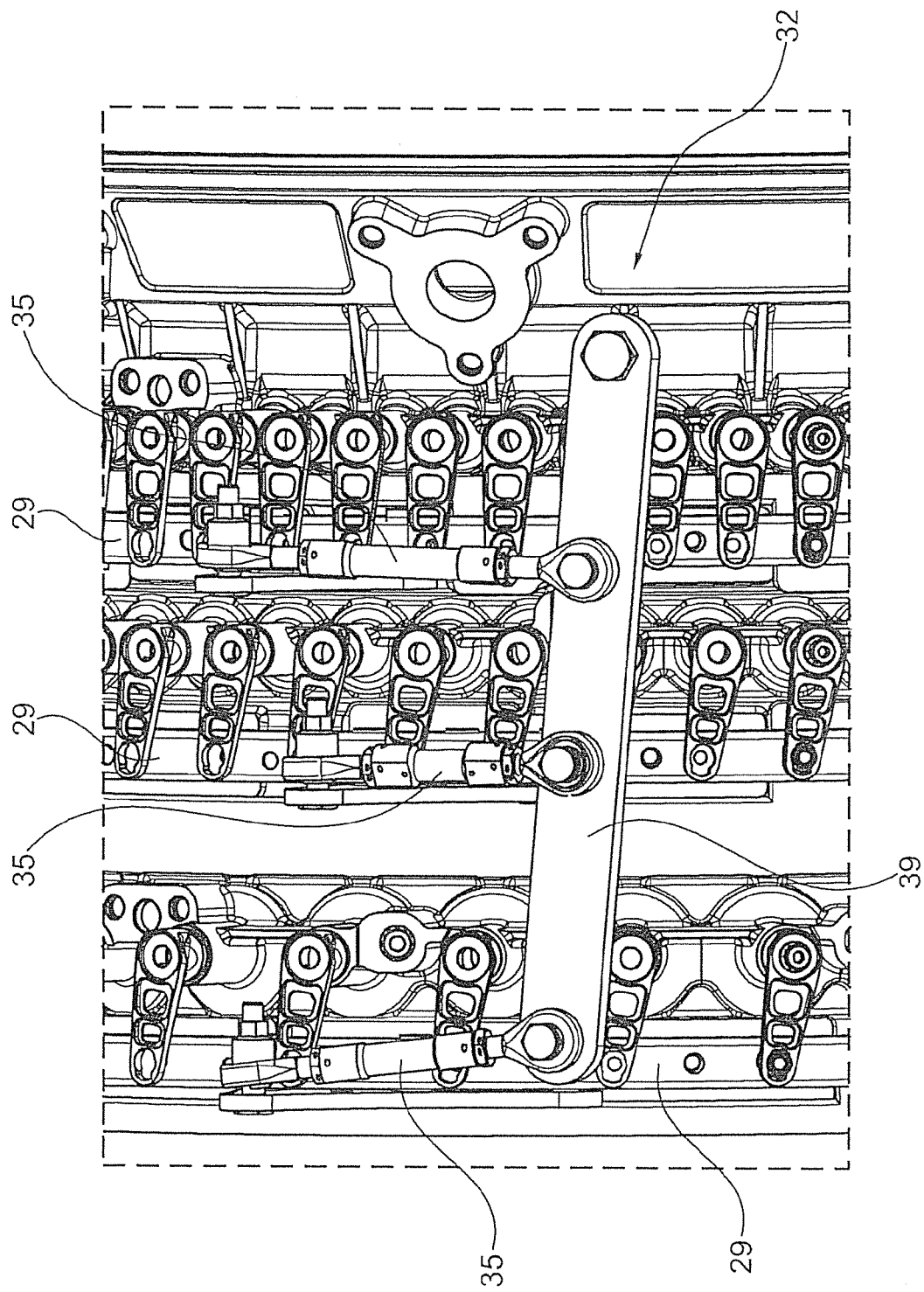

The present invention is described in the following in light of the accompanying drawing, showing exemplary embodiments. In the drawing, FIG. 1 shows a schematic representation of a gas-turbine engine in accordance with the present invention, FIG. 2 shows a perspective partial view of a compressor with adjustable stator vanes and stator vane adjusting rings, FIG. 3 shows a radial sectional view of a first exemplary embodiment of the present invention, FIG. 4 shows a detail view of an exemplary embodiment, by analogy with FIG. 3, with a transmission device in the form of a crankshaft, and FIGS. 5, 6 show further exemplary embodiments of transmission devices in the form of lever gears.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16 an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes, generally referred to as stator vanes 20 and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 1 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

The present invention is described in the following on the basis of a compressor, it is however also applicable to stator vanes of a turbine.

FIG. 2 shows a perspective partial view of a compressor having several rows of adjustable stator vanes 20, between which compressor rotor blades 22 are arranged. The individual stator vanes 20 are in each case swivellable about a radial axis 33. They are connected to a lever 34 which at its opposite end area is rotatably connected to a stator vane adjusting ring 29. Rotating the stator vane adjusting ring 29 in the circumferential direction results in swivelling of the individual levers 34. The effect of this is a rotation of the stator vanes 20 about the respective axis 33.

FIG. 3 shows a view in a radial sectional plane. The schematic representation in FIG. 3 shows a plurality of stator vanes 20. The latter are, as shown in FIG. 2, connected by means of the levers 34, not visible in FIG. 3, to the stator vane adjusting ring 29, likewise not shown.

FIG. 3 furthermore shows an actuating device 30 which is for example designed as a piston/cylinder unit. The actuating device 30 is connected to a crankshaft 36 using a connection rod 35 each, as shown in FIG. 4. The crankshaft 36 is mounted by means of bearings 37. The crankshaft 36 is furthermore connected to the stator vane adjusting rings 29 by means of connection rods 35. Operating the actuating device 30 thus leads to rotation or swivelling of the crankshaft 36, which in turns leads to rotation of the respective stator vane adjusting ring 29, since the crankshaft 36 is connected to the stator vane adjusting ring 29 by a connection rod 35.

The arrangement shown in the right-hand half of FIG. 3 thus forms a first transmission device 31 which is actively effective since it can be operated using the actuating device 30. Diametrically opposite to the first transmission device 31, a second transmission device 32 is provided which is designed identical to the first transmission device 31. The second transmission device 32 thus likewise includes connection rods 35 and a crankshaft 36. The second transmission device 32 thus has a passive effect and connects the two stator vane adjusting rings 29. The two transmission devices 31 and 32, being of identical design, have the same kinematic effect. The result of this is the forced connection as described in the above of the two stator vane adjusting rings 29, which in turn leads to a mutual control of the movement of the stator vane adjusting rings and hence to precise swivelling of the stator vanes 20.

The connection provided in accordance with the invention, and mutual control of the two stator vane adjusting rings 29, result in a high degree of accuracy during adjustment of the stator vanes, so that all stator vanes of a stator vane ring are adjustable in almost identical manner by nearly the same angular increments.

With the forced connection of the two stator vane adjusting rings provided in accordance with the invention, it is possible to precisely adjust these rings by means of only one actuating device 30. The second transmission device 32 can be implemented here at low cost, low weight and low space requirement.

FIGS. 5 and 6 show two further exemplary embodiments of the transmission device 31 or 32 in accordance with the invention. FIG. 5 shows here an arrangement with four stator vane adjusting rings 29 connected to one another by means of a second transmission device 32. FIGS. 5 and 6 each show only the second transmission device 32, which is, as mentioned, arranged diametrically to a first transmission device 31, not shown, which is designed identical to the second transmission device 32. FIG. 5 shows here a lever gear 38 having several levers each connected to the respective stator vane adjusting ring 29 by connection rods 35.

FIG. 6 shows a further exemplary embodiment having a lever 39 connected to the three stator vane adjusting rings 29 shown in FIG. 6 by means of the connection rod 35.

LIST OF REFERENCE NUMERALS

1 Engine axis
10 Gas-turbine engine
11 Air inlet
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Stator vanes
21 Engine casing
22 Compressor rotor blades
23 Stator vanes
24 Turbine blades
26 Compressor drum or disk
27 Turbine rotor hub
28 Exhaust cone
29 Stator vane adjusting ring
30 Actuating device
31 First transmission device (active)

32 Second transmission device (passive)
33 Axis
34 Lever
35 Connection rod
36 Crankshaft
37 Bearing
38 Lever gear
39 Lever

What is claimed is:

1. A stator vane adjusting device of a gas turbine having a plurality of stator vanes each swivellable about a radial axis and arranged in at least two radial planes, with at least two stator vane adjusting rings connected to the respective stator vanes and rotatable in a circumferential direction; comprising:
   an actuator for supplying an actuating force to each of the at least two stator vane adjusting rings;
   an active first transmission including a first crankshaft positioned in a first moving force path between the actuator and each of the at least two stator vane adjusting rings to transmit the actuating force from the actuator to each of the at least two stator vane adjusting rings;
   a passive second transmission including a second crankshaft including at least two crank arms connected respectively to the at least two stator vane adjusting rings, the passive second transmission receiving a moving driving force only from the actuator and only via a second force path from the active first transmission through each of the at least two stator vane adjusting rings to the passive second transmission;
   wherein the passive second transmission is positioned to be spaced apart around a circumference of the gas turbine from the active first transmission such that there is no overlap around the circumference between the passive second transmission and the active first transmission.

2. The device in accordance with claim 1, wherein the active first transmission and the passive second transmission are identical in structure with a same kinematic effect.

3. The device in accordance with claim 1, wherein the actuator includes a piston/cylinder unit.

4. The device in accordance with claim 1, wherein the active first transmission and the passive second transmission actively connect the at least two stator vane adjusting rings.

5. The device in accordance with claim 1, and further comprising a plurality of active first transmissions driven by a plurality of actuators and a plurality of passive second transmissions, the plurality of active first transmissions and the plurality of passive second transmissions spread around a circumference of the gas turbine.

6. The device in accordance with claim 1, wherein the passive second transmission is arranged diametrically opposite to the active first transmission around a circumference of the gas turbine.

7. The device in accordance with claim 1, wherein the active first transmission and the passive second transmission each provide a same kinematic effect to the at least two stator vane adjusting rings.

* * * * *